(12) United States Patent
Putrello, Jr.

(10) Patent No.: US 9,999,291 B1
(45) Date of Patent: Jun. 19, 2018

(54) PUTRELLO LIFT ASSIST WORK BELT

(71) Applicant: Andrew C. Putrello, Jr., Utica, NY (US)

(72) Inventor: Andrew C. Putrello, Jr., Utica, NY (US)

(73) Assignee: The Fountainhead Group, Inc., New York Mills, NY (US)

( * ) Notice: Subject to any disclaimer, the term of this patent is extended or adjusted under 35 U.S.C. 154(b) by 0 days. days.

(21) Appl. No.: 15/731,037

(22) Filed: Apr. 10, 2017

(51) Int. Cl.
*A45F 3/14* (2006.01)
*B65G 7/12* (2006.01)
*F16M 13/04* (2006.01)
*A45F 3/12* (2006.01)

(52) U.S. Cl.
CPC .................. *A45F 3/14* (2013.01); *A45F 3/12* (2013.01); *A45F 2003/122* (2013.01); *A45F 2003/142* (2013.01); *A45F 2003/144* (2013.01); *B65G 7/12* (2013.01); *F16M 13/04* (2013.01)

(58) Field of Classification Search
CPC .............. A45F 3/14; B65G 7/12; F16M 13/04
USPC ................... 224/270, 157, 259, 260
See application file for complete search history.

(56) References Cited

U.S. PATENT DOCUMENTS

| | | | | |
|---|---|---|---|---|
| 947,024 A * | 1/1910 | Priest | ......................... | A45F 5/00 224/270 |
| 4,319,704 A * | 3/1982 | Rosen | ..................... | A45F 5/021 224/269 |
| 5,826,763 A * | 10/1998 | Roberts | ..................... | A45F 3/14 224/197 |
| 5,941,436 A * | 8/1999 | Washington | ........... | A45C 15/00 224/259 |
| 5,950,886 A * | 9/1999 | Maupin | ..................... | A61G 1/04 224/157 |
| 6,053,383 A * | 4/2000 | Gunderson | ............... | A45F 3/14 108/43 |
| 6,790,201 B2 * | 9/2004 | Meyer | ................... | A61M 25/02 224/257 |
| 9,044,081 B2 * | 6/2015 | McDonald | ................ | A45F 3/14 |
| 9,781,992 B2 * | 10/2017 | Lee | ......................... | A45F 5/021 |
| 2003/0057246 A1 * | 3/2003 | Painter | ...................... | A45F 3/08 224/637 |
| 2005/0161479 A1 * | 7/2005 | Licsko | ...................... | A45F 3/14 224/270 |
| 2007/0017945 A1 * | 1/2007 | Willis | ....................... | A45F 3/14 224/270 |
| 2009/0179055 A1 * | 7/2009 | Estrellado | ................. | A45F 5/02 224/269 |

* cited by examiner

*Primary Examiner* — Justin Larson
(74) *Attorney, Agent, or Firm* — Bond Schoeneck & King, PLLC; George R. McGuire

(57) ABSTRACT

A Putrello lift assist work belt used for manual conveyance that includes a contoured weight bearing ledge that when structurally coupled with the back support belt and shoulder straps form a Putrello lift assist work belt system able to transfer substantial weight of the load being carried by manual conveyance to the hips and legs thus relieving stress and strain on the users back and arms. The elements and attributes of the Putrello lift assist work belt combine to form a manual conveyance lifting system that provides excellent rigidity and resistance to leverage force that results from having a heavy object extended and positioned in front of one's body thus preventing injury to the back, shoulders, and arms.

7 Claims, 2 Drawing Sheets

US 9,999,291 B1

PUTRELLO LIFT ASSIST WORK BELT

FIELD OF THE INVENTION

The present invention relates to a back support lifting belt and, more particularly, a back support lifting belt that includes a wearable carrying support ledge and provides a means to carry heavy objects a great distance without stress on back or arms.

BACKGROUND OF THE INVENTION

Back support belts have been used for many years during manual conveyance and can be particularly useful when carrying objects such as large heavy boxes. Typically back support belts are used around one's home or in the workplace to prevent injury or to protect the back of someone who is already suffering from a previous injury. Although back support belts have been used for many years while carrying heavy objects there has been little evolution in back support belt design. Presently, back support belts are fashioned using wide fabric or leather waist belts supported by smaller over the shoulder fabric or leather straps and secured around the user's body using Velcro or other securing methods. One of the many problems with current back support belt designs is that they do not include a load bearing element that can offset the leverage caused by having an object extended in front of one's body and be used to hold the object being carried in position during manual conveyance. In addition, they do not include an element that can redistribute the weight of the load to the user's hips, and legs thereby reducing stress on the back and arms. Many times back support belt users must walk great distances and maneuver through entrances while carrying heavy objects. This can cause the user's arms and back to become fatigued and or injured. Fatigue and injury results from having to physically oppose the leverage created by having a heavy object extended in front of the user and from supporting the object's weight against gravity with the user's arms and shoulders. Many times the user is forced to pull the heavy object being carried against their stomach and chest areas to prevent it from falling to the ground. This places even more strain on the arms, shoulders. back, and stomach. Current back support belt designs do not provide elements to firmly mechanically support the weight of heavy objects being carried and keep them in position. In addition, they do not provide elements to redistribute the weight of the load to the user's hips and legs. Ever since back support belts have been used while carrying heavy objects during manual conveyance there has been a need for one invention that would provide a complete support belt system that included at least one fixed or articulating mechanical weight bearing ledge able to transfer the weight of the load to the legs and hips, at least one fixed or stowable weight bearing ledge, a means to counter leverage forces developed when carrying heavy objects extended in front the user without the need for a substantial amount of additional materials all in one comfortable, safe, durable lightweight device that could be worn by the user. The present invention addresses the aforementioned problems by using a structural design that is aimed at minimizing the negative effects thus increasing the likelihood that the individual will wear and use the Putrello lift assist work belt and realize it's benefits.

SUMMARY OF THE INVENTION

In accordance with the present invention, there is provided . . . a back support belt that includes a contoured weight bearing ledge that when structurally coupled with the back support belt and shoulder straps form a secure lift assist work belt system able to transfer substantial weight of the load being carried by manual conveyance to the hips and legs thus relieving stress and strain on the user's back and arms. When carrying a box or other heavy object using the Putrello lift assist work belt the user need only gently stabilize the load with the arms and hands by placing the arms and hands extended to the side of the box or objects opposite their body. The elements and attributes of the Putrello lift assist work belt combine to form a manual conveyance lifting system that provides excellent rigidity and resistance to leverage force that results from having a heavy object extended and positioned in front of one's body. Once the box or other object is lifted and stabilized the user may walk, navigate through door ways, climb stairs, or pivot their bodies 360 degrees without the risk of dropping the box or other heavy object due to arm and back fatigue, strain, or slippage.

It would be advantageous to provide a . . . work belt that included back support and a rigid weight bearing ledge in one device It would also be advantageous to provide a . . . work belt that included vertical load leverage reducers It would further be advantageous to provide a . . . work belt that included an electrically non-conductive coating on the weight bearing ledge It would also be advantageous to provide a . . . work belt that included a weight bearing ledge that was fixed or articulating It would further be advantageous to provide a . . . work belt that accommodated people with oversized stomachs It would also be advantageous to provide a . . . work belt that included articulating weight bearing ledge with stowage magnets It would further be advantageous to provide a . . . work belt that included a weight bearing ledge that included a non-slip surface It would also be advantageous to provide a . . . work belt that transferred the load weight from the back and arms to the hips and legs It would further be advantageous to provide a . . . work belt that minimized load pressure on the user's stomach area

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
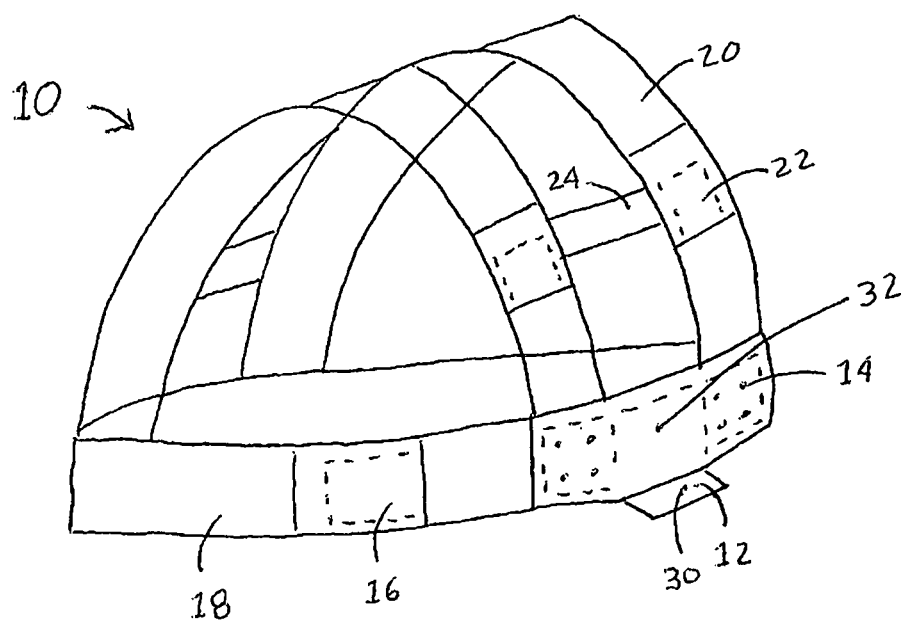
FIG. 1 is a perspective view of a putrello lift assist work belt in accordance with invention.

FIG. 1 is a perspective view of a Putrello lift assist work belt 10 in accordance with the invention.

Figure 2:
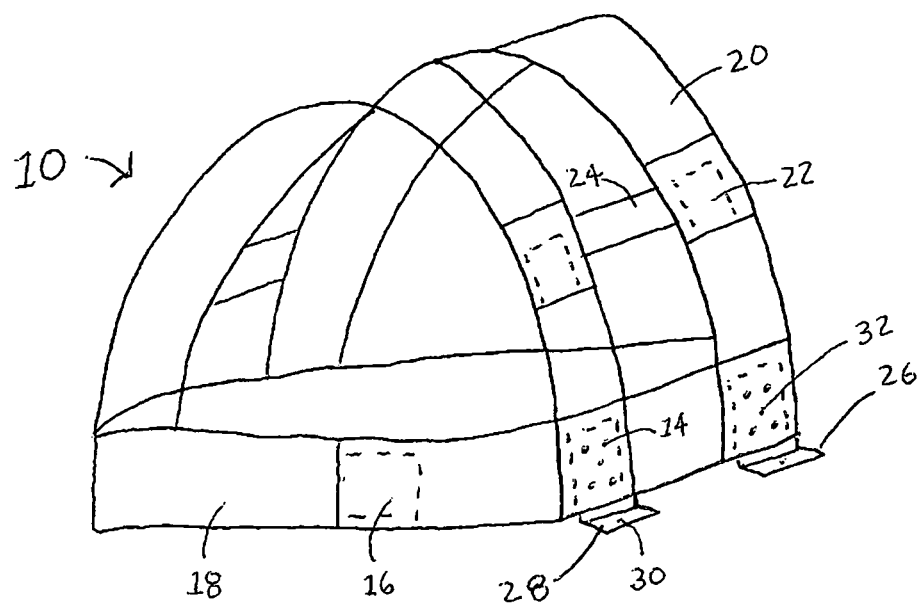
FIG. 2 is a perspective view of an alternate embodiment of putrello lift assist work belt.

FIG. 2 is a perspective view of an alternate embodiment of Putrello lift assist work belt 10.

Referring to FIGS. 1 to 2 each element of the Putrello lift assist work belt 10 is briefly described.

The Putrello lift assist work belt 10 of the invention includes, a weight bearing ledge 12, fasteners 14, Velcro fastener 16, back support belt 18, shoulder straps 20, Velcro shoulder strap fasteners 22, shoulder strap connector 24, alternate weight bearing ledge left 26, alternate weight bearing ledge right 28, stowage magnet bottom 30, and stowage magnet top 32 weight bearing ledge 12 can be made from any suitable rigid material and includes, a non-slip surface, is coated or constructed to be non-conductive to electricity, and is securely attached to back support belt 18 using fasteners 14 and can be fixed or articulating. The vertical portion of the weight bearing ledge 12 extends left and right laterally beyond the front horizontal ledge portion and is angled and contoured to the human body. The contoured weight bearing ledge 12 is important when the user has a very large stomach as it insures that the weight bearing ledge 12 is always accessible in front of the user and pressure on the stomach is minimized. Additionally, the vertical portion of the weight bearing ledge 12 is relatively longer than the horizontal portion of the weight bearing ledge 12 and is sandwiched between the outside and inside layers of the back support belt 18 and the outside and inside layers of the shoulder straps 20. This forms a vertical load leverage reducer and results in a transfer of weight away from the back and arms, to the hips and legs through the back support belt 18 and shoulder straps 20. This provides excellent rigidity and resistance to leverage force that results from having a heavy object extended and positioned in front of one's body. The Putrello lift assist work belt 10 is secured on the users body using the Velcro fastener 16. The securely attached shoulder straps 20 include Velcro shoulder strap fasteners 22 that are used to adjust for height differences between users. The shoulder straps 20 are held in position laterally by the stretchable shoulder strap connector 24. The weight bearing ledge 12 can easily be made to articulate using a hinge mechanism. If an articulating or hinged weight bearing ledge 12 is used, the articulating weight bearing ledge 12 can be held in the stowed position using stowage magnet bottom 30 and stowage magnet top 32 but any suitable securing mechanism could be used. An alternate design shown in FIG. 2 uses two separate weight bearing ledges alternate weight bearing ledge left 26 and alternate weight bearing ledge right 28. The alternate weight bearing ledge left 26 and alternate weight bearing ledge right 28 are mounted in the same fashion as the single weight bearing ledge 12 but in separate positions at the junction between the shoulder straps 20 and back support belt 18.

In operation and referring to FIG. 1 to FIG. 2, the present invention provides a weight bearing ledge 12 that is used to stabilize and carry heavy boxes or other objects to be moved by manual conveyance. The weight bearing ledge 12 transfers the weight from the arms and back to the hips legs thus allowing the user to walk great distances without stress or strain on their back and arms. In operation the user secures the Putrello lift assist work belt 10 to their torso using Velcro fastener 16 and adjusts shoulder straps 20 using Velcro shoulder strap fasteners 22. The user then lifts the heavy box or other objects by squatting down with their back vertically straight while bending their knees in a stable fashion. The user then picks up the box or other object and places it on top of the weight bearing ledge 12. The user then stands erect with the weight of the box or other object supported by the weight bearing ledge 12. Once the user is standing the box or other heavy object need only be gently stabilized with the arms and hands by placing the arms and hands extended to the side of the box or objects opposite their body. Once the box or other object is stabilized the user may walk, navigate through door ways, climb stairs, or pivot their bodies 360 degrees without the risk of dropping the box or other heavy object due to arm and back fatigue or strain.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A lift assist work belt for providing a weight bearing ledge, load transfer, and back support while manually carrying heavy objects, comprising:
   a pair of shoulder straps, wherein at least a portion of each shoulder strap is formed from inside and outside layers;
   a back support belt, wherein at least a portion of the back support belt is formed from inside and outside layers;
   and a weight bearing ledge, wherein the weight bearing ledge includes a vertical portion and a horizontal portion, and wherein the vertical portion is sandwiched between the inside and outside layers of each shoulder strap and also between the inside and outside layers of the back support belt.

2. The lift assist work belt of claim 1, wherein the horizontal portion of the weight bearing ledge is hinged to the vertical portion such that the horizontal portion can be held in a stowed position.

3. The lift assist work belt of claim 2, wherein the horizontal portion of the weight bearing ledge is held in the stowed position with magnets or other fasteners.

4. The lift assist work belt of claim 1, wherein the horizontal portion of the weight bearing ledge includes a non-slip and non-conductive surface.

5. The lift assist work belt of claim 1, wherein the vertical portion of the weight bearing ledge is contoured to fit against the user's torso.

6. The lift assist work belt of claim 1, wherein the back support belt includes a hook and loop fastener for removable fastening around the user's torso.

7. The lift assist work belt of claim 1, further comprising an elastic shoulder strap connector extending between the pair of shoulder straps.

* * * * *